United States Patent [19]

Soejima

[11] Patent Number: 5,052,508
[45] Date of Patent: Oct. 1, 1991

[54] STEERING CONTROL SYSTEM OF MOTOR VEHICLE

[75] Inventor: Yuji Soejima, Oizumi, Japan

[73] Assignee: Fuji Jukogyo Kabushiki Kaisha, Tokyo, Japan

[21] Appl. No.: 530,282

[22] Filed: May 30, 1990

[30] Foreign Application Priority Data

Jun. 6, 1989 [JP] Japan .................................. 1-66134[U]

[51] Int. Cl.5 ........................ B60K 17/358; B62D 5/06
[52] U.S. Cl. .................................... 180/234; 180/140; 180/143; 364/424.05
[58] Field of Search ............... 180/140, 141, 143, 234; 280/91; 364/424.05

[56] References Cited

U.S. PATENT DOCUMENTS

| 4,361,871 | 11/1982 | Miller et al. | 180/197 X |
| 4,645,025 | 2/1987 | Ohe et al. | 180/142 X |
| 4,687,214 | 8/1987 | Uno | 180/140 X |
| 4,757,870 | 7/1988 | Torii et al. | 364/424.05 |
| 4,901,811 | 2/1990 | Uno et al. | 280/91 X |
| 4,941,095 | 7/1990 | Imaseki et al. | 180/140 X |
| 4,949,265 | 8/1990 | Eguchi et al. | 280/91 X |

FOREIGN PATENT DOCUMENTS 166664 7/1988 Japan ................................. 180/140

Primary Examiner—Charles A. Marmor
Assistant Examiner—Kevin Hurley
Attorney, Agent, or Firm—Beveridge, DeGrandi & Weilacher

[57] ABSTRACT

A motor vehicle is provided with a steering control system in which rear wheels are steered in response to steered angle of front wheels and vehicle speeds. The control system includes a first speed sensor for detecting a vehicle speed in association with a rotation of the front wheels and a second speed sensor for detecting a vehicle speed in association with a rotation of the rear wheels. The steering of the rear wheels is controlled by a steering control unit in dependency on a ratio of a vehicle speed signal from the first speed sensor with respect to a vehicle speed signal from the second speed sensor. Thus, the steering control unit transmits a signal for restricting steering of the rear wheels in a case where a condition in which the ratio of the vehicle speed signals from the first and second sensor is out of a predetermined range continues for a predetermined time.

10 Claims, 3 Drawing Sheets

STEERING CONTROL SYSTEM OF MOTOR VEHICLE

BACKGROUND OF THE INVENTION

The present invention relates to a steering control system of a motor vehicle and, more particularly, to a rear wheel steering control system of the motor vehicle in response to signals representing vehicle speed.

In a known art, there is provided a control system for steering rear wheels of the motor vehicle in which the rear wheels are automatically steered in response to steering angles of front wheels. The control system of this type is disclosed in the Japanese Patent Laid-open Publication No. 61-175183, in which the control system includes first and second vehicle speed sensors located at two portions of the vehicle, means for determining whether a difference value between output signals from the first and second speed sensors is above or below a predetermined value, and means for restricting the rear wheels from over-steering more than a predetermined value such that the difference value between the output signals from both the speed sensors is above the predetermined value.

However, in the steering control system of the type described above, when the difference value between the output signals from the two speed sensors is above the predetermined value, the steering of the rear wheels is prohibited on the discrimination of abnormal condition of the speed sensors located at two portions of the vehicle body. Accordingly, in a case where the predetermined value is preliminarily set to a desired value in a low speed operation area of a vehicle, the control system will liably detect the difference value, as an abnormal value, which may not be an abnormal difference value in a high speed driving of the vehicle.

SUMMARY OF THE INVENTION

An object of the present invention is to substantially eliminate the defects or drawbacks encountered to the prior art described above and to provide a steering control system of a motor vehicle capable of stably detecting abnormal condition of a vehicle speed signal regardless of high or low vehicle speed and restricting steering of the rear wheels of the vehicle when detecting unstable condition of the vehicle.

This and other objects can be achieved according to the present invention by providing a steering control system of a motor vehicle in which rear wheels are steered in response to steered angle of front wheels and vehicle speed, the control system comprising a first sensor for detecting a vehicle speed in association with a rotation of the front wheels, a second sensor for detecting a vehicle speed in association with a rotation of the rear wheels, and a control unit for controlling steering of the rear wheels in dependency on a ratio of a vehicle speed signal from the first sensor to a vehicle speed signal from the second sensor.

The steering operation control unit transmits a signal for controlling the steering operation of the rear wheels in response to the speed signal from the second sensor in a case where the ratio of the vehicle speed signals from the first and second sensor is within a predetermined range.

The steering control unit also transmits a signal for controlling the steering of the rear wheels in response to one of the vehicle speed signals larger than the other where the ratio of the vehicle speed signals from the first and second sensors is out of a predetermined range continues for a predetermined time interval.

According to the steering control system described above, when the rear wheels are locked and the unstable condition of the vehicle is detected during the steering control, the abnormal condition of the vehicle speed signals is accurately detected by first and second sensors regardless of high or low vehicle speed in response to the ratio of the vehicle speed signals transmitted from the first and second sensors and the steering control unit transmits a signal for restricting to steer the rear wheels of the vehicle.

A preferred embodiment of the present invention will become understood from the following detailed description referring to the accompanying drawings.

DETAILED DESCRIPTION OF THE INVENTION

Figure 1:
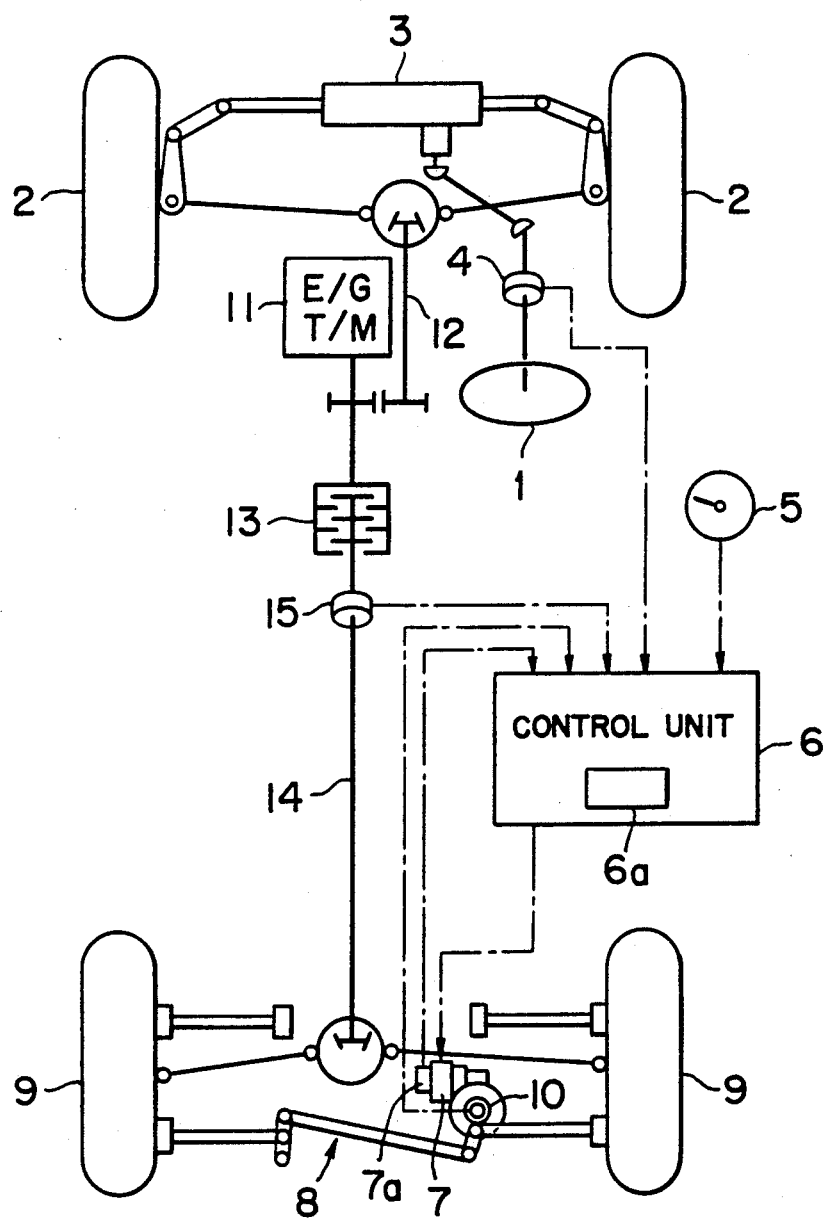
FIG. 1 is a schematic plan view showing a four wheel drive vehicle to which the present invention is applied.

FIG. 1 shows a four wheel drive vehicle equipped with a four wheel driving mechanism and a steering control system according to the present invention, in which a known rack-pinion type steering unit 3 is arranged in a front wheel steering system disposed in between a steering wheel 1 and front wheels 2. A front wheel steering angle sensor 4 for transmitting a signal representing a front wheel steering angle is operatively connected to the steering unit 3. Reference numeral 5 designates a first vehicle speed sensor for transmitting a speed signal $V_f$ in response to the vehicle speed. The front wheel steering angle signal and the speed signal are input into a control unit which is designated by reference numeral 6 in FIG. 1.

The control unit 6 determines a reference value of a rear wheel steering angle in response to the front wheel steering angle signal and the speed signal in accordance with preliminarily set front wheel steering angle-vehicle speed-rear wheel steering angle characteristics. The control unit 6 also transmits an output signal to an actuator 7 such as electric motor for the rear wheel steering in response to the thus determined reference value and to change the steering angle of the rear wheel 9 through a rear wheel steering mechanism 8 including, for example, a speed reduction mechanism utilizing a worm gear and a link mechanism, whereby the rear wheels 9 are changed in the steering direction with the reference steering angle in accordance with a feedback control in response to the rear wheel steering angle signal from a rear wheel steering angle sensor 10.

Referring to FIG. 1, a sensor 7a for detecting a rotational speed of a motor as the actuator 7 generates a signal representing the motor rotation speed, which is controlled in response to the output signal from the control unit 6.

A power unit 11 includes an engine and a transmission and the torque of an output shaft of the power unit 11 is transmitted respectively to a front drive shaft 12 and a rear drive shaft 14 through a center differential unit 13 thereby driving the front and rear wheels 2 and 9.

Figure 2:
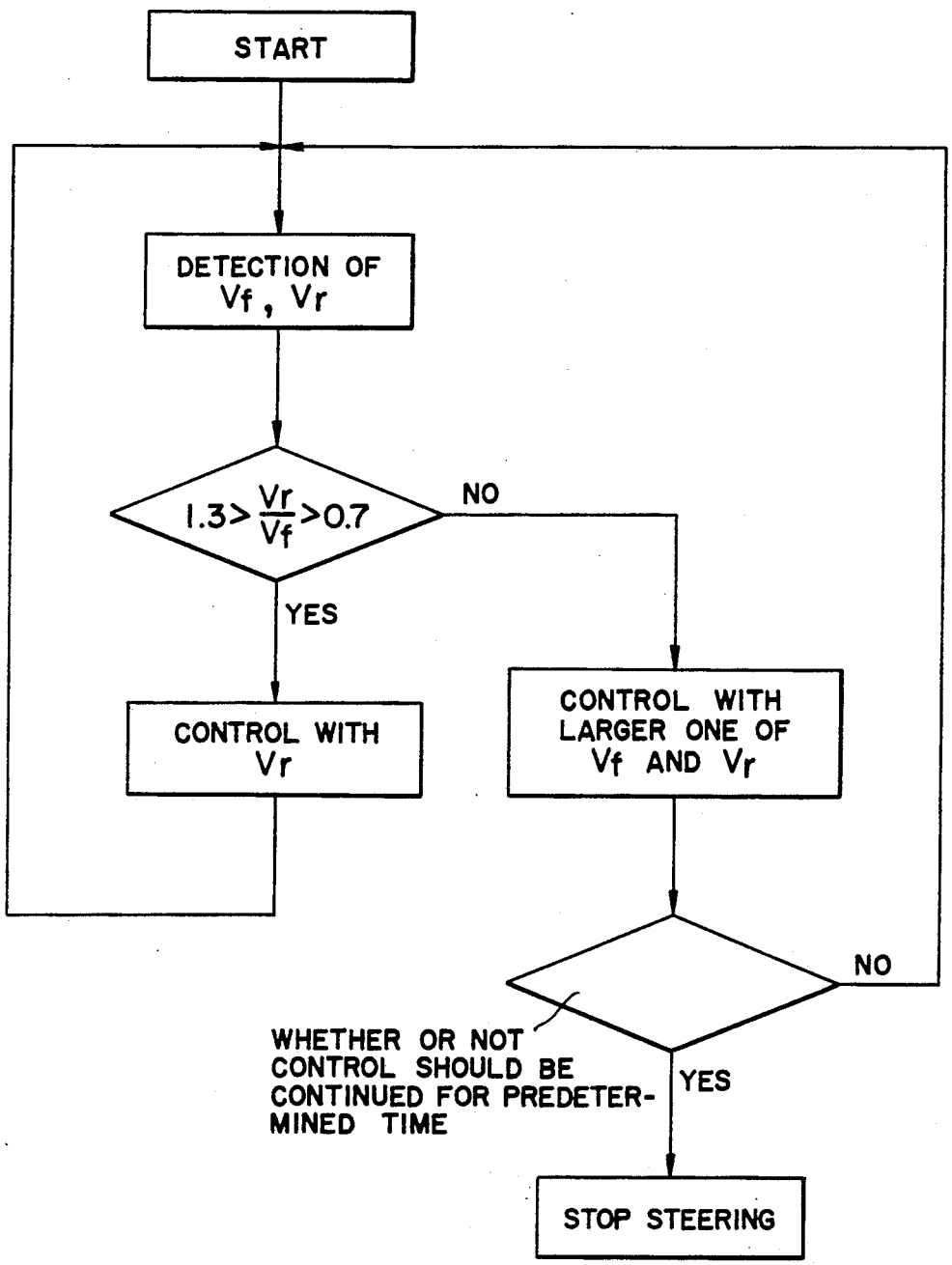
FIG. 2 is a flowchart representing the operation mode of the steering control unit according to the present invention.

The present invention is applied to the four wheel drive vehicle described above. Namely, according to the present invention, a second vehicle speed sensor 15 for detecting a rotation of the rear drive shaft 14 and transmitting a speed signal $V_r$ in response to the detected vehicle speed. The control unit 6 includes a logic circuit means 6a which acts in the following manner as represented by FIG. 2. The rear wheel steering is controlled in response to the speed signal $V_r$ from the second speed sensor 15 in a case where the ratio ($V_r/V_f$) of the speed signal $V_r$ from the second speed sensor 15 with respect to the speed signal $V_f$ from the first speed sensor 5 is within a predetermined ratio (for example, 0.7 to 1.3). On the other hand, in a case where the ratio becomes different from the predetermined ratio, the rear wheel steering is controlled in response to one of signals $V_r$ and $V_f$ which is larger than the other. The logic circuit means 6a further stops the control of the rear wheel steering in a case where the condition that the ratio becomes different from the predetermined ratio continues for the predetermined time (3.5 sec., for example).

Figure 3:
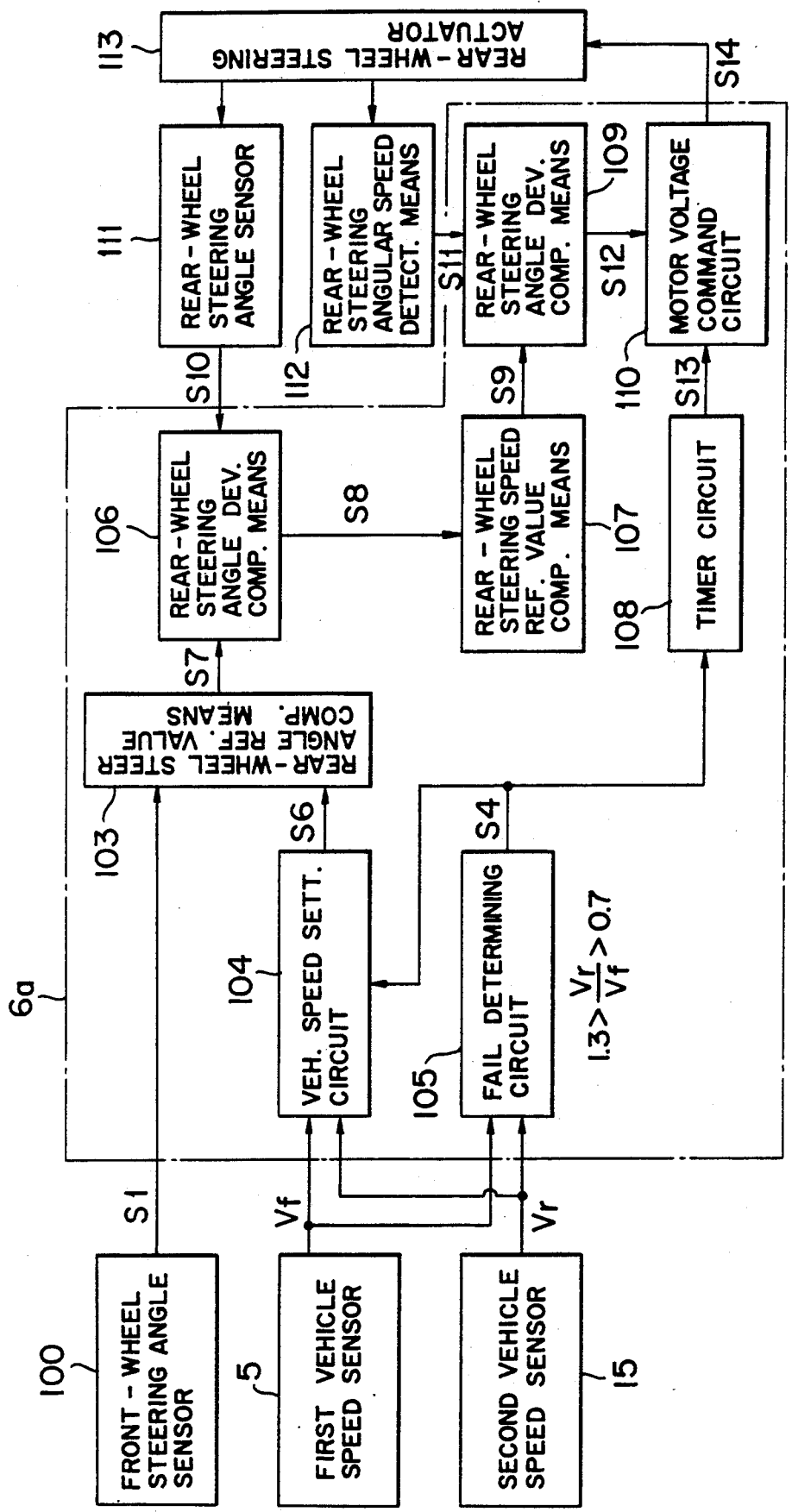
FIG. 3 is a block diagram of a logic circuit of the steering control unit according to the present invention.

The detail of the logic circuit means 6a will be represented by a block diagram of FIG. 3.

Referring to FIG. 3, the logic circuit means 6a includes a vehicle speed setting circuit 104, a fail determining circuit 105, a rear wheel steering angle reference value computing means 103, a rear wheel steering angle deviation computing means 106, a rear wheel steering speed reference value computing means 107, a rear wheel steering angle speed deviation computing means 109, a motor voltage command circuit 110, and a timer circuit 108.

Referring to FIG. 3, a steering angle signal S1 transmitted from a front wheel steering angle sensor 100 is input into the rear wheel steering angle reference value computing means 103 of the logic circuit means 6a. The speed signal $V_f$ transmitted from the first vehicle speed sensor 5 is input into the vehicle speed setting circuit 104 and the fail determining circuit 105. The speed signal $V_r$ transmitted from the second vehicle speed sensor 15 is input into the vehicle speed setting circuit 104 and the fail determining circuit 105. In the fail determining circuit 105, it is determined as to whether or not the ratio $V_r/V_f$ is within a predetermined range, for example, in a range of $1.3 > V_r/V_f > 0.7$. In a case where the ratio is not in the predetermined range, a signal S4 representing an error of the sensors 5, 15 is transmitted to timer circuit 108 and the vehicle speed setting circuit 104. Consequently, the vehicle speed setting circuit 104 sets a larger value of two speed signals $V_f$, $V_r$ to a vehicle speed which is used for the steering control, and produces a signal S6.

Furthermore, the timer circuit 108 counts the predetermined time and then produces a signal S13 for indicating the stop of the steering control.

To the contrary, in a case where the ratio is within the predetermined range, a signal S4 representing a normality of the sensors 5, 15 is transmitted to the circuits 108, 104. In response to the signal S4, the vehicle speed setting circuit 104 sets the speed signal $V_r$ from the second vehicle speed sensor 15 to a vehicle speed used in the steering control system. In the rear wheel steering angle reference value computing means 103, the reference value is calculated in response to the signals S1 and S6. A signal S7 representing the calculated reference value is input into the rear wheel steering angle deviation computing means 106. A signal S10 representing the rear wheel steering angle detected by a rear wheel steering angle sensor 111 connected to the rear wheel steering actuator, i.e. electric motor, 113 is also input into the rear wheel steering angle deviation computing means 106, in which the calculation of the rear wheel steering angle deviation is then carried out. A signal S8 representing the thus calculated deviation value is input into the rear wheel steering speed reference value computing means 107. A signal S9 representing the rear wheel steering speed reference value is transmitted from the rear wheel steering angular speed reference value computing means 107 into the rear wheel steering angular speed deviation computing means 109. In the rear wheel steering angular speed deviation computing means 109, the rear wheel steering angular speed deviation is calculated in response to the signal S9 and a signal S11 transmitted from a rear wheel steering angular speed detecting means 112, which is connected to the rear wheel steering actuator 113. A signal S12 representing the thus calculated rear wheel steering angular speed deviation value is then input into the motor voltage command circuit 110, into which the signal S13 from the timer circuit 108 is input after a predetermined time lapse. In response to the signal S12, the motor voltage command circuit 110 transmits a signal S14 representing the voltage of the actuator 113 to the rear wheel steering actuator 113 to steer the rear wheels. In responsive to the signal S13, the command circuit 110 prohibits the steering control so that the rear wheels are maintained at a straight state.

According to the incorporation of the logic circuit means 6a into the control unit 6 attaining the functions described above, the abnormal condition of the vehicle speed signal being a significant factor for the rear wheel steering control of the vehicle can be stably detected regardless of the vehicle speed conditions such as high or low speed condition. When the rear wheels are locked during a braking of the vehicle and the vehicle becomes in an instable operational condition, electrical conduction to the actuator 7 for steering the rear wheels 9 is restricted. At this time, the rear wheels 9 are maintained in non-steered state, thus substantially reducing the undesired motion of the rear wheels and, hence, reducing the application of the unnecessary load to the rear wheel steering system.

In the preferred embodiment described above, the second sensor 15 for detecting the rotation of the rear drive shaft 14 is mounted to the rear drive shaft 14 of a four wheel drive vehicle provided with a four wheel driving mechanism. However, the present invention includes an embodiment in which vehicle speed sensors for detecting the rotational speeds of bilateral two rear wheels are located when the present invention is applied to a front wheel driving vehicle, i.e. the rear wheels follow the front wheels. In this embodiment, a mean value of the output signals from both the sensors may be estimated as the vehicle speed signal from the second vehicle speed sensor described in the former embodiment.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A steering control system of a motor vehicle in which rear wheels are steered in response to steering angle of front wheels and a vehicle speed, comprising:

first sensor means for detecting a vehicle speed in association with a rotational speed of the front wheels and for generating a first speed signal;

second sensor means for detecting a vehicle speed in association with a rotational speed of the rear wheels and for generating a second speed signal; and control means responsive to said first speed signal and said second speed signal for calculating a ratio of the first speed signal to the second speed signal and for controlling steering of the rear wheels in response to the second speed signal when the ratio is within a predetermined range.

2. The steering control system according to claim 1, wherein said vehicle has a four wheel driving mechanism, and said second sensor means is mounted to a rear drive shaft of said four wheel driving mechanism to detect a rotation of the rear drive shaft.

3. The steering control system according to claim 1, wherein said second sensor means includes two sensors detecting speeds of bilateral rear wheel respectively, and said second sensor means is adapted to calculate a mean value of output signals from said two sensors.

4. The steering control system according to claim 1, wherein said control means is adapted to respond said predetermined range which is set as larger than 0.7 and smaller than 1.3.

5. A steering control system of a motor vehicle in which rear wheels are steered in response to steering angle of front wheels and a vehicle speed, comprising:

first sensor means for detecting a vehicle speed in association with a rotational speed of the front wheels and for generating a first speed signal;

second sensor means for detecting a vehicle speed in association with a rotational speed of the rear wheels and for generating a second speed signal; and control means responsive to said first speed signal and said second speed signal for calculating a ratio of the first speed signal to the second speed signal and for controlling steering of the rear wheels in response to one of the first and second speed signals larger than the other when the ratio is outside of a predetermined range.

6. The steering control system according to claim 5, wherein said vehicle has a four wheel driving mechanism, and said second sensor means is mounted to a rear drive shaft of said four wheel driving mechanism to detect a rotation of the rear drive shaft.

7. The steering control system according to claim 5, wherein said second sensor means includes two sensors detecting speeds of bilateral rear wheel respectively, and said second sensor means is adapted to calculate a mean value of output signals from said two sensors.

8. The steering control system according to claim 5, wherein said control means is adapted to respond said predetermined range which is set as larger than 0.7 and smaller than 1.3.

9. The steering control system according to claim 5, said control means comprises timer means for counting a predetermined time after said ratio exceeds said predetermined range and for stopping control to steer said rear wheels after said predetermined time is lapsed.

10. A component of a steering control system for a motor vehicle, having first sensor means for detecting a first vehicle speed in accordance with a rotational speed of front wheels of the vehicle and second sensor means for detecting a second vehicle speed in accordance with a rotational speed of rear wheels of the vehicle, said component comprising:

determining means for calculating a ratio of said first vehicle speed to said second vehicle speed and for determining an abnormal condition of said first and second sensor means, based on said ratio, when said ratio exceeds a predetermined range so as to stably detect the abnormal condition of said sensor means regardless of the magnitude of the driving speed of the motor vehicle.

* * * * *